(12) United States Patent
Senatori

(10) Patent No.: US 10,168,746 B2
(45) Date of Patent: Jan. 1, 2019

(54) HINGE MECHANISM FOR A COMPUTING DEVICE

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/748,179

(22) PCT Filed: Nov. 20, 2015

(86) PCT No.: PCT/US2015/061915
§ 371 (c)(1),
(2) Date: Jan. 27, 2018

(87) PCT Pub. No.: WO2017/086996
PCT Pub. Date: May 26, 2017

(65) Prior Publication Data
US 2018/0224899 A1 Aug. 9, 2018

(51) Int. Cl.
*G06F 1/16* (2006.01)
*E05D 3/02* (2006.01)
*E05D 11/06* (2006.01)
*E05D 11/08* (2006.01)

(52) U.S. Cl.
CPC ............ *G06F 1/1681* (2013.01); *E05D 3/02* (2013.01); *E05D 11/06* (2013.01); *E05D 11/087* (2013.01); *G06F 1/1613* (2013.01); *G06F 1/1615* (2013.01); *G06F 1/1616* (2013.01); *E05Y 2201/224* (2013.01); *E05Y 2900/606* (2013.01)

(58) Field of Classification Search
CPC .... G06F 1/1681; G06F 1/1616; G06F 1/1615; G06F 1/1613
See application file for complete search history.

(56) References Cited

U.S. PATENT DOCUMENTS

| 5,566,048 A | 10/1996 | Esterberg et al. |
| 6,359,776 B2 | 3/2002 | Carlson |
| 7,886,903 B1 | 2/2011 | Wurzelbacher et al. |
| 8,599,546 B2 | 12/2013 | Nagasaki |

(Continued)

FOREIGN PATENT DOCUMENTS

TW 201042172 A1 12/2010

*Primary Examiner* — Nidhi Thaker
(74) *Attorney, Agent, or Firm* — HPI Patent Department

(57) ABSTRACT

Examples disclosed herein provide a hinge mechanism to pivotally connect housings of a computing device along an axis. As an example, the hinge mechanism includes a guide rail fixed to the first housing, a base block fixed to the second housing, and a rotary element to constrain the guide rail to the base block, wherein the guide rail and the base block are concentric along the axis, and the guide rail is to rotate around the base block. As an example, the hinge mechanism includes a rotation assembly comprising a slot on one end to receive a pin of the guide rail in order to link the guide rail to the rotation assembly. As an example, the rotation assembly is to provide a level of resistance to a torque provided when opening or closing the first housing with respect to the second housing.

15 Claims, 4 Drawing Sheets

(56) References Cited

U.S. PATENT DOCUMENTS

| | | | |
|---|---|---|---|
| 9,841,789 B2* | 12/2017 | Lin | G06F 1/1615 |
| 9,939,851 B2* | 4/2018 | Lan | G06F 1/1681 |
| 9,964,998 B2* | 5/2018 | Park | E05D 11/10 |
| 10,001,815 B1* | 6/2018 | Yao | G06F 1/1681 |
| 10,028,398 B1* | 7/2018 | Lin | E05D 3/18 |
| 10,037,057 B2* | 7/2018 | Schafer | G06F 1/1681 |
| 10,066,429 B2* | 9/2018 | Park | E05D 1/04 |
| 2003/0163900 A1 | 9/2003 | Rude et al. | |
| 2004/0093447 A1 | 5/2004 | Numano | |
| 2006/0023408 A1 | 2/2006 | Schlesener et al. | |
| 2006/0082518 A1 | 4/2006 | Ram | |
| 2009/0089973 A1* | 4/2009 | Lee | G06F 1/1616 |
| | | | 16/223 |
| 2010/0139034 A1* | 6/2010 | Shen | G06F 1/1681 |
| | | | 16/2.1 |
| 2012/0102675 A1* | 5/2012 | Lee | G06F 1/1681 |
| | | | 16/243 |
| 2012/0205368 A1* | 8/2012 | Lin | G06F 1/1681 |
| | | | 220/4.22 |
| 2015/0092335 A1 | 4/2015 | Patrick et al. | |
| 2015/0120980 A1 | 4/2015 | Kim | |
| 2016/0369543 A1* | 12/2016 | Park | E05D 11/082 |
| 2017/0208703 A1* | 7/2017 | Lin | E05F 1/1016 |
| 2017/0284457 A1* | 10/2017 | Park | F16C 11/103 |
| 2017/0292302 A1* | 10/2017 | Tomky | E05D 11/082 |

* cited by examiner

HINGE MECHANISM FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Many form factors exist for notebook computers. A common form factor includes hinges that connect the two members of the clamshell-type design at the common end. A challenge faced by manufacturers of notebook computers is allowing for clearance of the hinges or other moving parts as the notebook computer is opened and closed, without having to give up much space from the base member or display member to accommodate the hinges.

Examples disclosed herein provide a hinge mechanism for a computing device, such as a notebook computer, with a virtual pivot axis, which allows for the hinge mechanism to be concealed within the base member of the notebook computer, and then emerge when the notebook computer is opened. The hinge mechanism may allow for the base member and the display member of the notebook computer to be mounted flush against each other, without the need for large gaps or cuts in adjacent surfaces of the members to accommodate the hinge mechanism.

Figure 1:
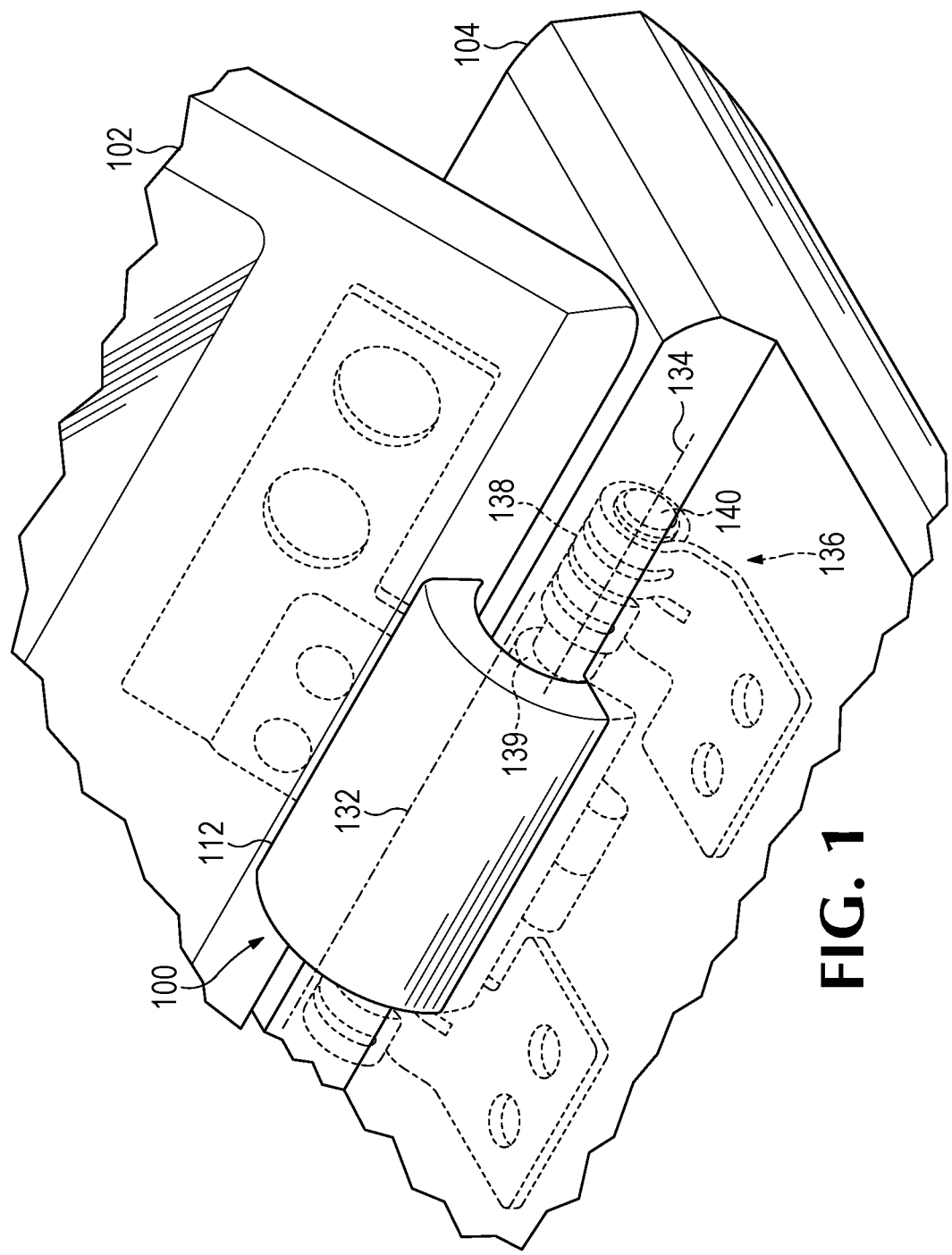
FIG. 1 illustrates a hinge mechanism of a computing device, according to an example.

With reference to the figures, FIG. 1 illustrates a hinge mechanism 100 of a computing device, such as a notebook computer, according to an example. The computing device includes a base member 104 and a display member 102 that may be pivotally connected to each other via the hinge mechanism 100. As an example, the base member 104 includes an area for user input, such as a touchpad and a keyboard. The display member 102 includes a display screen for viewing the video output of the computing device, and may include input means for operation by a user, such as a touchscreen (e.g., the display screen may be the touchscreen). Although only one hinge mechanism 100 is illustrated, the computing device may include any number of similar hinge mechanisms 100 along the common end shared by the display member 102 and base member 104.

Referring to FIG. 1, the hinge mechanism 100 may include a hinge cap 112 to cover the components of the hinge mechanism 100, as will be further described. In addition, the hinge cap 112 may contain any electrical cables that have to pass through the hinge mechanism 100. As an example, the hinge cap 112 can be attached to either the display member 102 or the base member 104, or can float between the two members 102, 104. In the floating mode, the start and end points of the hinge cap 112 may be controlled by the angular positions of the display member 102 and/or base member 104.

As illustrated, the hinge mechanism 100 has a virtual pivot axis 132 outside of the computing device that moves in a rotary motion, allowing the display member 102 to be pivotally connected to the base member 104 along the virtual pivot axis 132. As an example, this virtual pivot axis 132 allows the hinge mechanism 100 to be hidden within the base member 104 of the computing device. For example, the base member 104 may include an opening for accommodating and concealing the hinge mechanism 100 when the notebook computer is closed.

As an example, the hinge mechanism 100 may include a rotation assembly 136 in order to provide a level of resistance to a torque provided when opening or closing the display member 102 with respect to the base member 104. The level of resistance provided via the rotation assembly 136 may allow for the display member to be positioned in a number of various viewing angles. As the pivot point of the main portion of the hinge mechanism 100 is virtual and outside of the computing device (i.e., virtual pivot axis 132), the rotation assembly 136 may be positioned within the base member 104 and have a rotational axis 134 offset from the virtual pivot axis 132. As an example, this offset between the hinge mechanism 100 and the rotation assembly 136 may be bridged by a pin on a guide rail of the hinge mechanism 100 and a slot 139 on the rotation assembly 136, allowing the main portion of the hinge mechanism 100 and the rotation assembly 136 to rotate freely but along two different paths (e.g., virtual pivot axis 132 & rotational axis 134).

As an example, a pivot point of the rotation assembly 136 around the rotational axis 134 may have a frictional value to provide the level of resistance to the torque provided when opening or closing the display member 102 with respect to the base member 104. The frictional value provided by the rotation assembly 136 may be transferred to the main portion of the hinge mechanism 100 via a combination of the pin and the slot 139, as will be further described. As an example, the frictional value of the pivot point of the rotation assembly 136 may be provided by elements 138 which generally include friction hinges, clutches, washers, and/or bands.

As an example, the elements 138 may be a number of question-mark bands placed over a shaft 140. As illustrated, the question-mark bands may be anchored internally within the base member 104. The frictional value provided by the rotation assembly 136 may be generated through the interference between the inside diameter of the question-mark bands and the outside diameter of the shaft 140. The level of the frictional value of the pivot point may be sufficient to allow the display member 102 to be positioned at any angle without falling backwards while the computing device is being used.

Figure 2:
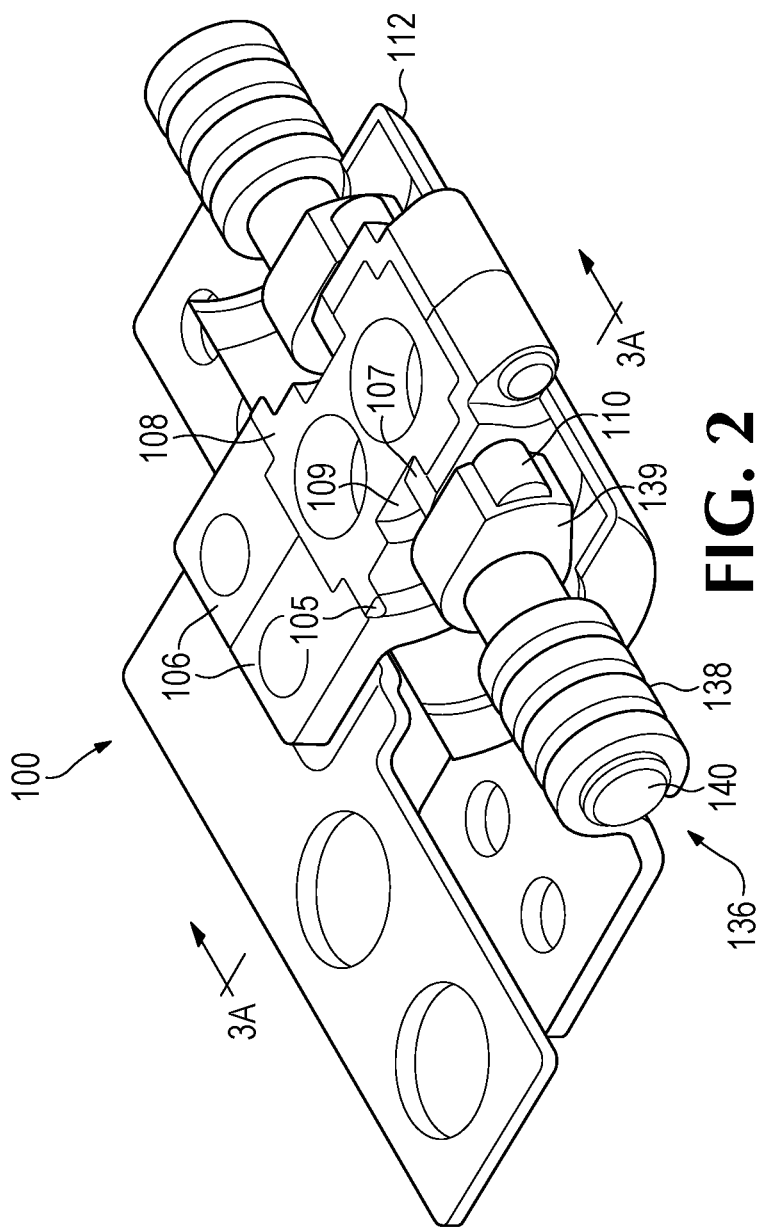
FIG. 2 illustrates various components of the hinge mechanism in a closed state, according to an example.

FIG. 2 illustrates various components of the hinge mechanism 100 in a closed state, according to an example. As an example, features of the hinge mechanism 100 include a hinge element to constrain the hinge movement, and a rotary friction element (e.g., rotation assembly 136) to provide a level of resistance to a torque provided when opening or closing the display member 102. With regards to the hinge element, the hinge mechanism 100 includes a guide rail 106 and a base block 108. As an example, the guide rail 106 may be fixed to a first housing of the computing device, such as the display member 102, and the base block 108 may be fixed to a second housing of the computing device, such as the base member 104. As illustrated, the guide rail 106 is made up of two parts that clamp over the base block 108, creating a unified hinge element. However, the guide rail 106 may be one part that clamps over the base block 108. As illustrated, the hinge cap 112 may cover the guide rail 106.

As an example, the guide rail 106 and the base block 108 may include concentric grooves that allow the guide rail 106 and the base block 108 to rotate freely with respect to each other, similar to two tubes rotating together. However, as the guide rail 106 and the base block 108 are half round shapes, the outer tube, which in this case is the guide rail 106, is no longer constrained to the base block 108. As an example, a rotary element 107 is added to the guide rail 106, forming an inner tube that then constrains the guide rail 106 to the base block 108. As illustrated, the base block 108 may include an indentation 109 to allow for movement of the rotary element 107 as the guide rail 106 is to rotate around the base block 108. In order for the guide rail 106 and the base block 108 to be concentric along an axis (e.g., virtual pivot axis 132), the rotary element 107 may be placed as close to the theoretical center as possible, to provide the smoothest movement with little or no binding.

Figure 3A:
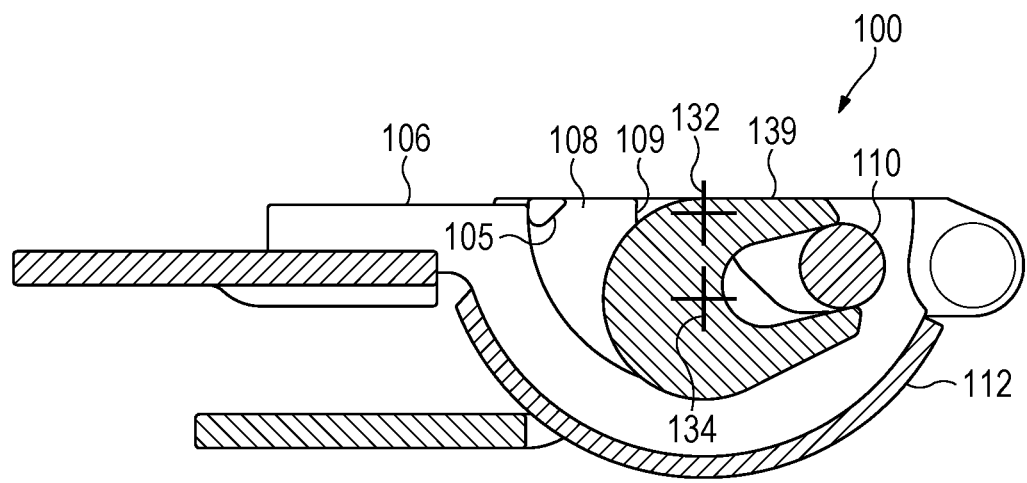
FIGS. 3A-D illustrate a cross section of the hinge mechanism as it is transitioned from a closed state to a fully opened state, according to an example.
Figure 3B:
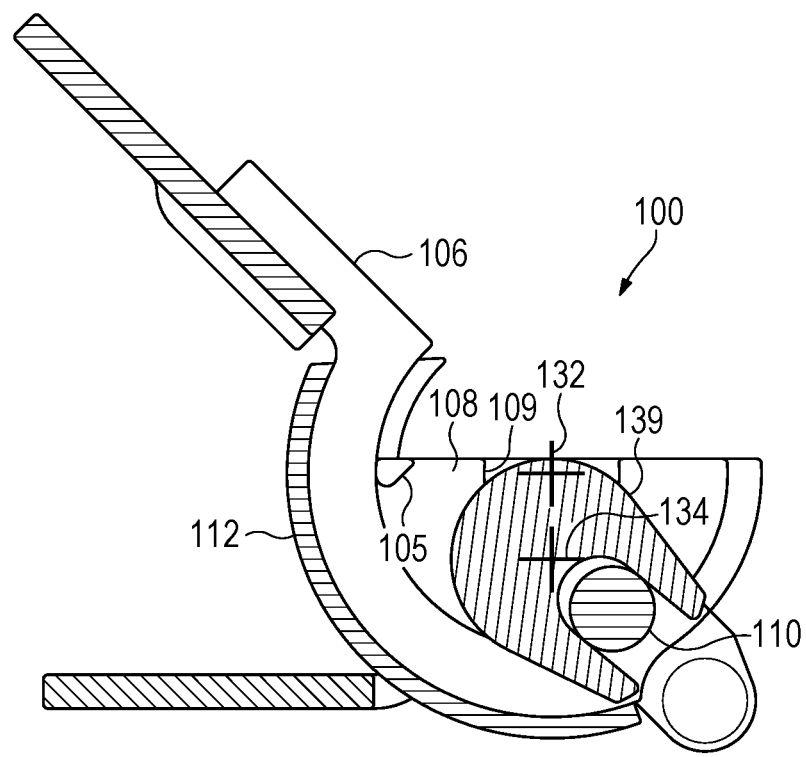
Figure 3C:
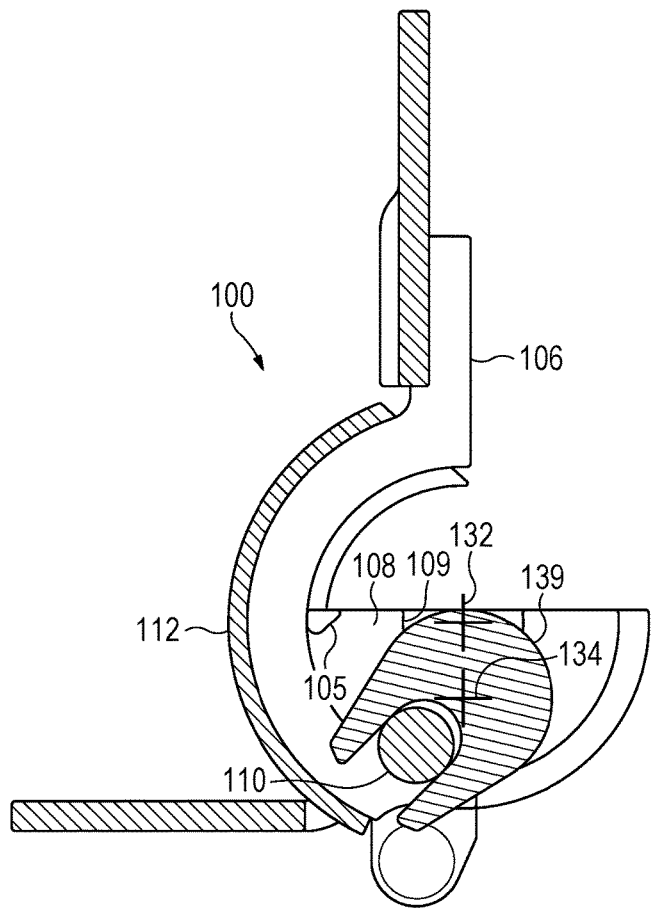
Figure 3D:
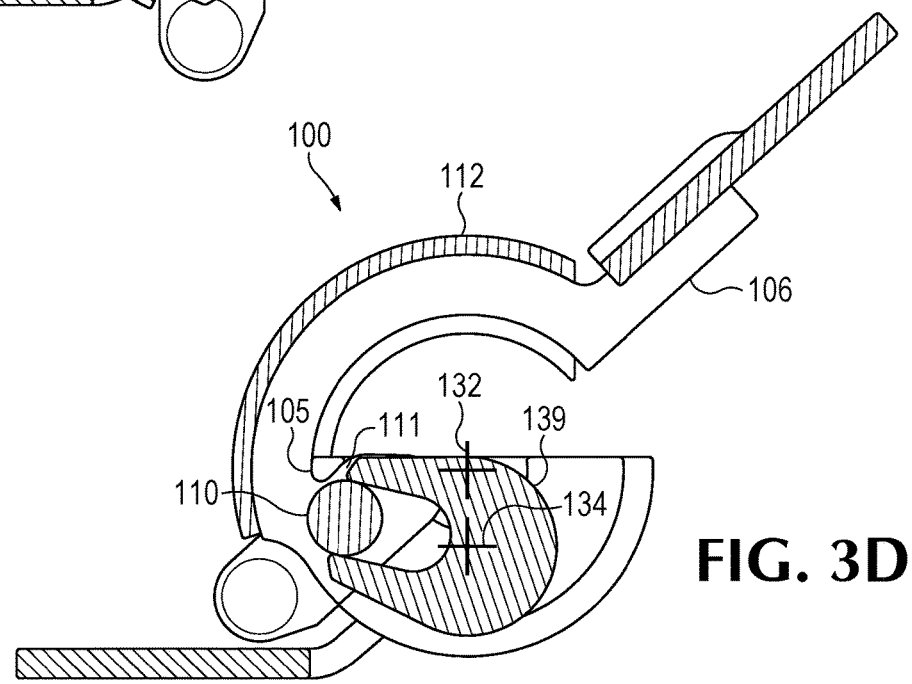

As an example, the hinge mechanism 100 may incorporate hard stop features that prevent over rotation of the guide rail 106 with respect to the base block 108. For example, referring to FIG. 2, in order to prevent over rotation while opening the computing device, the base block 108 may include a notch 105 to come into contact with another notch of the guide rail 106 (e.g., notch 111, as illustrated in FIG. 3D), as will be further described below.

As an example, there may be a small assembly gap between the guide rail 106 and the base block 108 that contains either grease or a viscous fluid to control the feel of the guide rail 106 and the base block 108 as they slide together and prevent material wear. To control this gap and reduce slop in the hinge mechanism 100, secondary wear bumps may be added in this area to accomplish an interference fit, or small spring fingers may be added to bias the guide rail 106 and the base block 108 against each other in one direction.

As described above, the rotation assembly 136 may provide a level of resistance to a torque provided when opening or closing the display member 102, allowing for the display member 102 to be positioned in a number of various viewing angles. As the rotation assembly 136 is offset from the rest of the hinge mechanism 100, this offset may be bridged by a pin 110 on the guide rail 106 and the slot 139 on the rotation assembly 136, as illustrated. The frictional value provided by the rotation assembly 136 may be transferred to the main portion of the hinge mechanism 100 via a combination of the pin 110 and the slot 139. For example, as the guide rail 106 is rotated around the base block 108 (e.g., when the display member 102 is opened or closed), the pin 110 may force the rotation assembly 136 to rotate FIGS. 3A-D illustrate a cross section of the hinge mechanism 100 as it is transitioned from a closed state to a fully opened state, according to an example. The cross section illustrated is depicted by 3A in FIG. 2. As the guide rail 106 is coupled to, for example, the display member 102 (e.g., see FIG. 1), when torque is applied to open or closed the display member 102, the frictional value provided by the rotation assembly 136 may provide the level of resistance to the torque applied, in order to provide for smooth opening and closing of the computing device. As the rotational axis 134 of the rotation assembly 136 is offset from the virtual pivot axis 132 of the hinge mechanism 100, this offset may be bridged by the pin 110 on the guide rail 106 and the slot 139 on the rotation assembly 136, as described above. As illustrated in FIGS. 3A-D, as the guide rail 106 is rotated around the base block 108 (e.g., when the display member 102 is opened or closed), the pin 110 may follow the slot 139 and cause the rotation assembly 136 to rotate.

As mentioned above, the hinge mechanism 100 may incorporate hard stop features that prevent over rotation of the guide rail 106 with respect to the base block 108. Referring to FIG. 3D, the base block 108 may include notch 105 that prevents any further rotation of the guide rail 106 once notch 111 of the guide rail 106 comes in contact with notch 105.

As an example, the level of resistance provided by the rotation assembly 136 may vary, based on the angle of the display member 102 with respect to the base member 104, to which the base block 108 is fixed. This may be particularly useful when the torque required to open or close the display member 102 varies. As an example, the range of motion of the pin 110 as it follows the slot 139, while the display member 102 is being rotated, may vary the torque. As a result, by varying the level of resistance provided by the rotation assembly 136, based on the angle of the display member 102 with respect to the base member 104, the torque than required to open or close the display member 102 may remain consistent throughout rotation. As an example, to ensure a consistent torque while opening or closing the display member 102, the rotation assembly 136 may have a variable torque built into it, which changes as the rotation assembly 136 is rotated.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A hinge mechanism to pivotally connect first and second housings of a computing device along an axis, the hinge mechanism comprising:

a guide rail fixed to the first housing, wherein the guide rail comprises a pin;

a base block fixed to the second housing;

a rotary element to constrain the guide rail to the base block, wherein the guide rail and the base block are concentric along the axis, and the guide rail is to rotate around the base block; and a rotation assembly comprising a slot on one end to receive the pin of the guide rail in order to link the guide rail to the rotation assembly, wherein a rotational axis of the rotation assembly is offset from the axis, and the rotation assembly is to provide a level of resistance to a torque provided when opening or closing the first housing with respect to the second housing.

2. The hinge mechanism of claim 1, wherein opening r closing the first housing is to rotate the guide rail around the base block.

3. The hinge mechanism of claim 2, wherein as the guide rail is to rotate around the base block, the pin is to rotate the rotation assembly via the slot.

4. The hinge mechanism of claim 1, wherein a pivot point of the rotation assembly around the rotational axis has a frictional value to provide the level of resistance to the torque provided when opening or closing the first housing with respect to the second housing.

5. The hinge mechanism of claim 4, wherein the frictional value of the pivot point of the rotation assembly is provided by an element comprising friction hinges, clutches, washers, and bands.

6. The hinge mechanism of claim 1, wherein the guide rail and the base block comprise concentric grooves to allow the guide rail to rotate around the base block.

7. The hinge mechanism of claim 1, comprising hard stop features to prevent over rotation first and second housing with respect to each other.

8. The hinge mechanism of claim comprising a hinge cap to cover the guide rail.

9. A computing device comprising:
a display member;
a base member; and
a hinge mechanism to pivotally connect he display and base members along an axis, the hinge mechanism comprising:
   a guide rail fixed to the display member, wherein the guide rail comprises a pin;
   a base block fixed to the base member;
   a rotary element to constrain the guide rail to the base block, wherein the guide rail and the base block are concentric along the axis, and, the guide rail is to rotate around the base block; and
   a rotation assembly comprising a slot on one end to receive the pin of the guide rail in order to link the guide rail to the rotation assembly, wherein a rotational axis of the rotation assembly is offset from the axis, and the rotation assembly is to provide a level of resistance to a torque provided when the guide rail is to rotate around the base block.

10. The computing device of claim 9, wherein as the guide rail is to rotate around the base block, the pin is to rotate the rotation assembly via the slot.

11. The computing device of claim 9, wherein a pivot point of the rotation assembly around the rotational axis has a frictional value to provide the level of resistance to the torque provided when opening or closing the display member.

12. The computing device of claim 9, wherein the guide rail and the base block comprise concentric grooves to allow the guide rail to rotate around the base block.

13. A hinge mechanism to pivotally connect first and second housings of a computing device along an axis, the hinge mechanism comprising:
a guide rail fixed to the first housing, wherein the guide rail comprises a pin;
a base block fixed to the second housing:
a rotary element to constrain the guide rail to the base block, wherein the guide rail and the base block are concentric along the axis, and the guide rail is to rotate around the base block; and
a rotation assembly comprising a slot on one end to receive the pin of the guide rail in order to link the guide rail to the rotation assembly, wherein a rotational axis of the rotation assembly is offset from the axis, and the rotation assembly is to provide a variable level of resistance to a torque provided when opening or closing the first housing with respect to the second housing, wherein the variable level of resistance is based on an angle of the first housing with respect to the second housing.

14. The hinge mechanism of claim 13, wherein the guide rail and the base block comprise concentric grooves to allow the guide rail to rotate around the base block.

15. The hinge mechanism of claim 13, comprising hard stop features to prevent over rotation first and second housing with respect to each other.

* * * * *

UNITED STATES PATENT AND TRADEMARK OFFICE
CERTIFICATE OF CORRECTION

PATENT NO. : 10,168,746 B2
APPLICATION NO. : 15/748179
DATED : January 1, 2019
INVENTOR(S) : Mark David Senatori Page 1 of 1

It is certified that error appears in the above-identified patent and that said Letters Patent is hereby corrected as shown below:

In the Claims

In Column 5, Line 15, Claim 2, delete "r" and insert -- or --, therefor.

In Column 5, Line 36, Claim 8, after "claim" insert -- 1, --.

In Column 5, Line 41, Claim 9, delete "he" and insert -- the --, therefor.

In Column 6, Line 1, Claim 9, delete "and," and insert -- and --, therefor.

In Column 6, Line 26, Claim 13, delete "housing:" and insert -- housing; --, therefor.

Signed and Sealed this
Twenty-sixth Day of March, 2019

Andrei Iancu
*Director of the United States Patent and Trademark Office*